United States Patent [19]

Fromson

[11] Patent Number: 4,921,609
[45] Date of Patent: May 1, 1990

[54] CIRCULAR LAMELLA CLARIFIER

[76] Inventor: Robert E. Fromson, 3603 Ridgewood Dr., Pittsburgh, Pa. 15235

[21] Appl. No.: 371,338

[22] Filed: Jun. 26, 1989

[51] Int. Cl.$^5$ ............................................. B01D 21/02
[52] U.S. Cl. .................................. 210/521; 210/522; 55/278
[58] Field of Search ...................... 210/521, 522, 532.1; 55/278

[56] References Cited

U.S. PATENT DOCUMENTS

| | | | |
|---|---|---|---|
| 103,239 | 5/1870 | Robinson | 210/532.1 |
| 590,535 | 9/1897 | Arbuckle | 210/521 |
| 3,306,456 | 2/1967 | Fromson | 210/521 |
| 3,718,257 | 2/1973 | Buch | 210/521 |

FOREIGN PATENT DOCUMENTS

| | | |
|---|---|---|
| 19179 | 2/1905 | Austria . |
| 165093 | 1/1950 | Austria . |
| 117538 | 8/1899 | Fed. Rep. of Germany . |
| 300294 | 8/1916 | Fed. Rep. of Germany . |
| 1242202 | 7/1986 | U.S.S.R. . |

*Primary Examiner*—W. Gary Jones
*Assistant Examiner*—Christopher Upton
*Attorney, Agent, or Firm*—Ronald S. Lombard

[57] ABSTRACT

A circular lamella clarifier is disclosed having a radially extending lip member to provide optimum flow straightening prior to entering the gap separation between the stacked lamella members. Other features of the circular lamella clarifier such as preferred gap separation is disclosed. A method for making the lamella members is disclosed.

15 Claims, 5 Drawing Sheets

_4,921,609_

CIRCULAR LAMELLA CLARIFIER

BACKGROUND OF THE INVENTION

The present invention relates to separating apparatus and, in particular, to a lamella clarifier which separates the heavier fluid or fluidized solid matter from lighter fluid or fluidized solid matter by gravity.

U.S. Pat. No. 3,306,456, dated Feb. 28, 1967, by the present inventor and another discloses an apparatus having a circular lamella design. The circular lamella design was developed to remove sub-micron particles of ferrous hydroxide form basic electrolytes in the electro-chemical machining process.

It is essential that a lamella operate under laminar flow conditons. Thus, with an increasing flow rate more element plates are required. Conventional lamellas have the top of the inclined plates above the liquid level and are not suitable for immergence-type systems. The design of U.S. Pat. No. 3,306,456, contemplates operation of the apparatus as an immersible device. This design includes downwardly directed integral inlet baffles to supply quiescent, smooth, non-agitated entrance liquid into the troughs. As described in the aforesaid patent, it was found that occassionally overlapping baffles may contact each other disrupting the flow and it was found desirable that only every fourth member of the stack have the baffle. Baffles of the intermediate members were removed, but it has been found that this may cause problems with turbulent flow entering the troughs where there are no baffles. In addition, removal of the baffles presented significant difficulties in manufacturing.

SUMMARY OF THE INVENTION

The present invention overcomes the difficulties of the aforementioned prior art circular lamella design.

The present invention provides a lamella clarifier which may be made of plastic, metal or ceramic.

The circular lamella clarifier of the present invention comprises an input and an output. A lamella including a plurality of vertically stacked thinned-walled hollow frusto-conical, spaced-apart, convoluted lamella members are provided. Each of the lamella members has a central opening in vertical alignment with the central openings of the other lamella members. A plurality of circumferentially distributed inclined V-shaped troughs are included which diverge downwardly. A plurality of conical peak sections are provided at for example, 30° to the lamella axis. Each of the peak sections separate a pair of adjacent trough walls. Each of the troughs has a sludge port extending through the lower most portion thereof and in vertical alignment with the sludge ports of the other lamella members. The sludge ports includes sludge port walls extending below the lower most portion of the troughs. Each of the troughs include oppositely disposed trough walls. The troughs include integral dam means surrounding a predetermined portion of each of the sludge ports. The dam means includes a lower most dam portion at the outer periphery of the lamella member and a pair of oppositely disposed side wall members adjacent to the lower most dam portion. The dam function is to prevent short-circuiting of fluid to the sludge port.

An integral flow-straightening lip member radially extending from each of the trough walls is provided at the outer periphery thereof. The flow-straightening lip member optimizes the entrance flow between lamella members. Integral spacer means for providing a predetermined gap separation between the lamella members are included. Preferably the lip member has a radial dimension equal to about at least three times the gap separation to about four times the gap separation. The lip member preferrably has a radial dimension three and half times the gap separation.

Other aspects of the present invention provide that the length of the dam wall is desirably at least about one fifth the length of the bottom of the V-shape trough to about one fourth the length of the bottom of the V-shape trough. The bottom of the V-shape trough is preferably at about a 60 degree angle to the axis of the lamella member. The sludge port walls are tapered. The lamella clarifier desirably further includes an integral radially extending rigidizing lip member affixed to the outer periphery the lamella member adjacent the flow straightening lip member and cooperates with the flow straightening lip members to encircle the lamella member in providing increased rigidity to the lamella member and aid in trimming.

It has been found that preferably imaginary extensions of the edges of the adjoining 30° peaks intersect at a point which is coterminous with the edge of the central opening. This maximizes the clean flow area at the center of the lamella. Desirably a second imaginery extension of the bottom of the said V-shaped trough intersects the point of intersection of the imaginery extensions of the adjoining peak edges.

It has been found desirable to ion-implant the clarifier of the present invention when it is made of ceramic with a materal such as silicon carbide or other release materials when the clarifier is used in harsh environments such as a power plant exhaust where fly ash constituents impinge the clarifier member.

A method of making the lamella clarifier member of the present invention is also described.

BRIEF DESCRIPTION OF THE DRAWINGS

For better understanding of the invention, reference may be had to the exemplary embodiments shown in the accompanying drawings, in which.

BRIEF DESCRIPTION OF THE PREFERRED EMBODIMENTS

Figure 1:
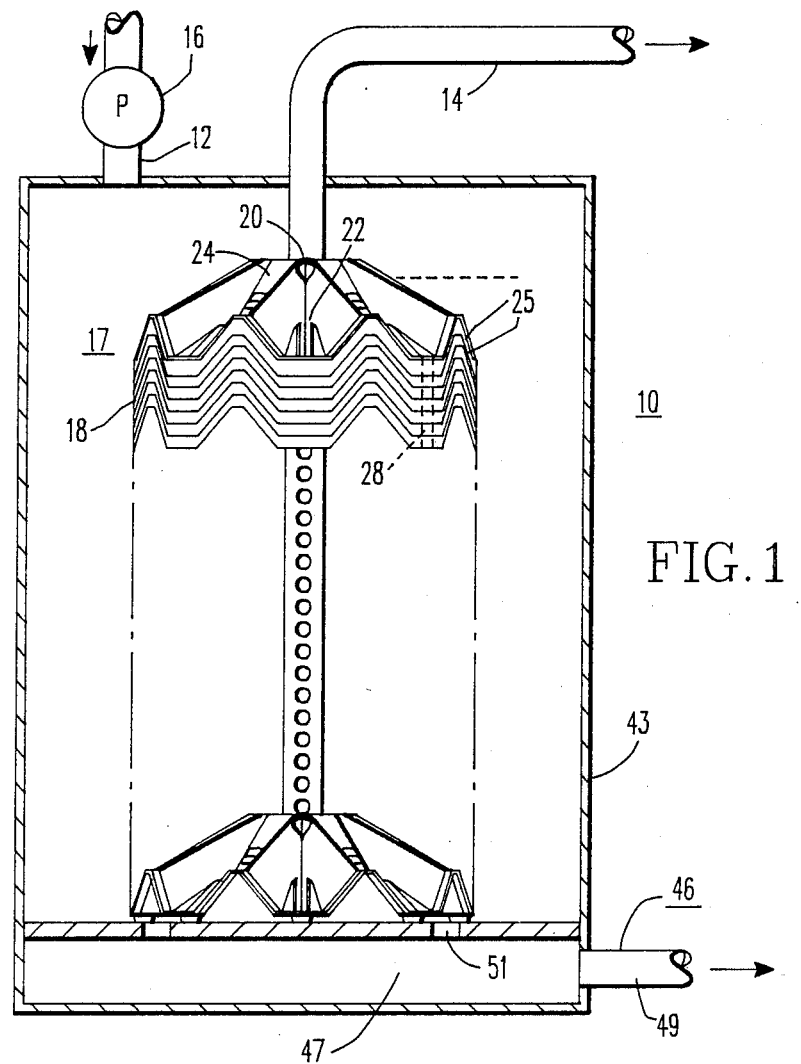
FIG. 1 is an elevational view of the circular lamella clarifier of the present invention.

Referring to FIG. 1 there is shown a circular lamella clarifier 10 comprising an input 12 and an output 14. A pump means 16 is included for providing a flow for the fluid mixture to be clarified through clarifier 10. Reference may be had to the aforesaid U.S. Pat. No.

3,306,456, for a more detailed discussion of the operation of this type of clarifier.

With reference to FIGS. 1, 1B, 2-4, the clarifier 10 of the present invention further includes lamella 17 including a plurality of vertically stacked thinned-walled hollow, frusto conical, spaced-apart convoluted lamella members 18. Each of the lamella members 18 has a central opening 20 in vertical alignment with the central openings of the other lamella members. The central openings 20 are in fluid communication with the output means 14 and carry the cleansed fluid out of the clarifier 10. For a more detailed description of the clarifier operation reference may be had to the aforesaid U.S. Pat. No. 3,306,456.

Figure 2:
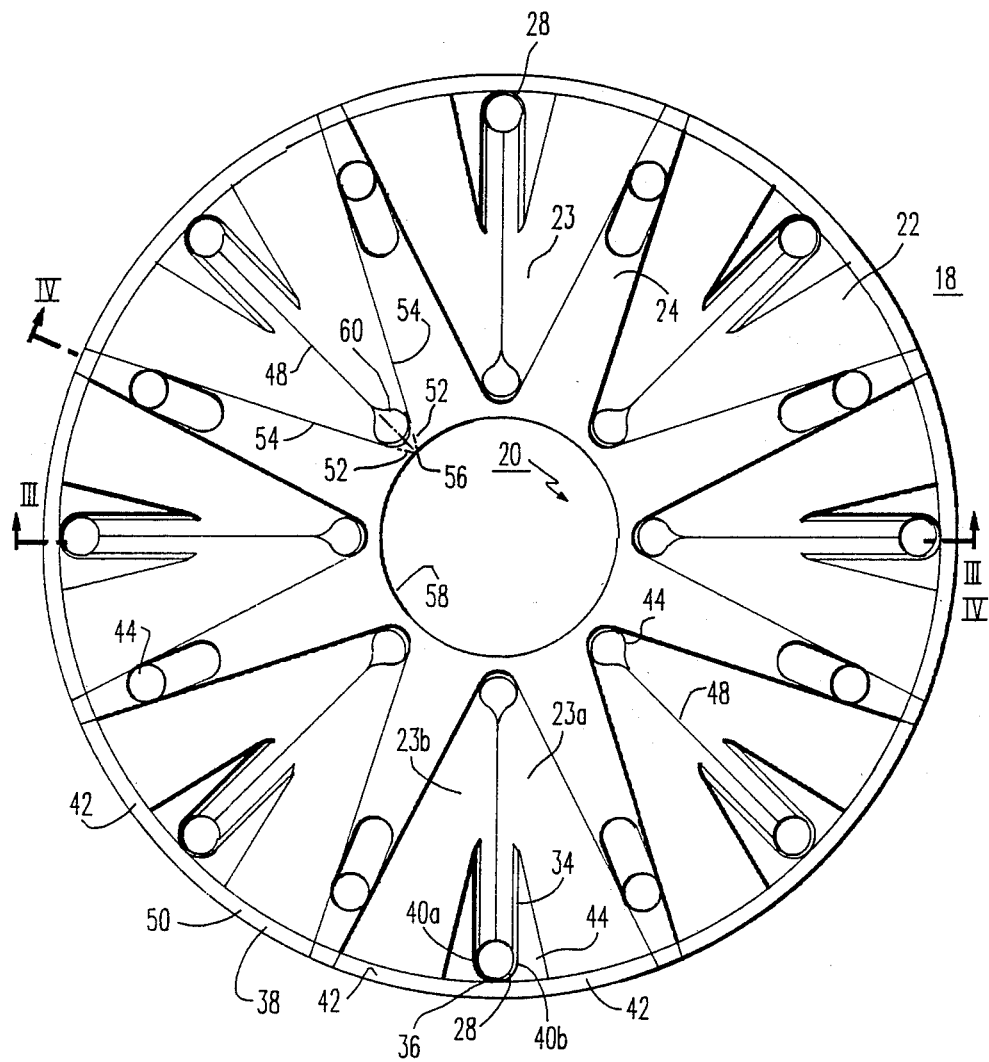
FIG. 2 is a plan view of the thinned-walled hollow frusto-conical lamella member of the present invention.
Figure 4:
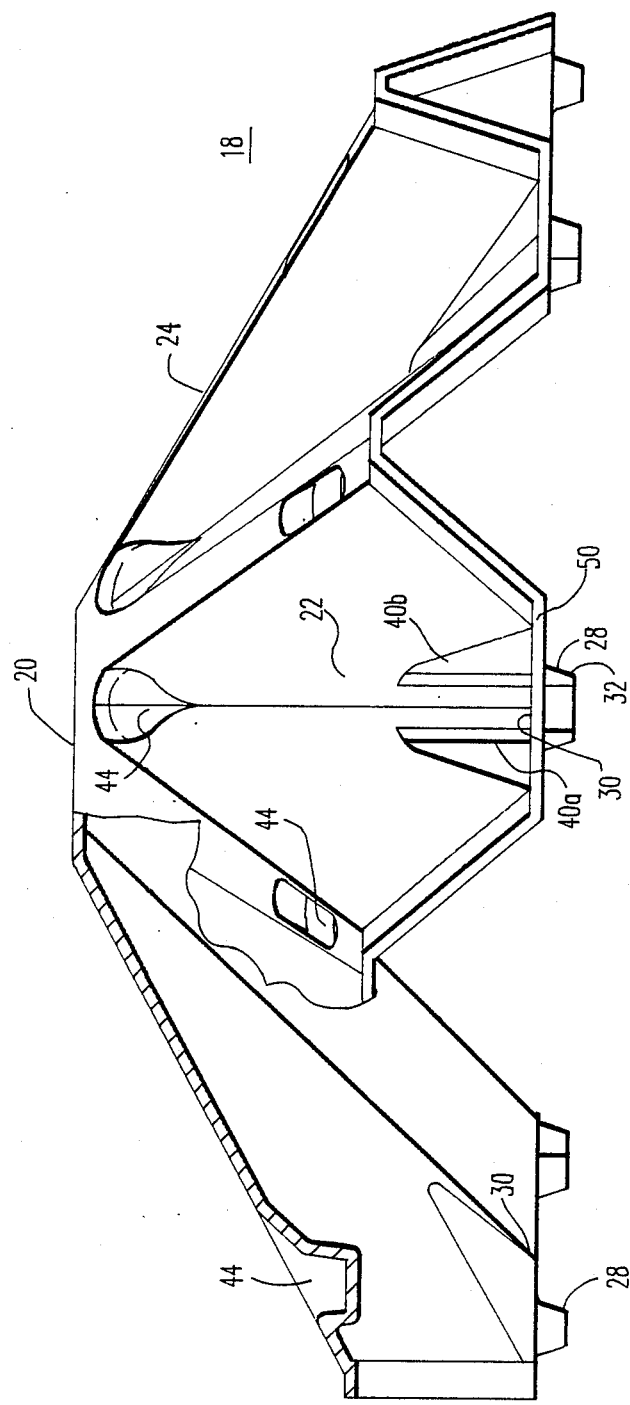
FIG. 4 is an elevational view of the lamella member of the present invention partly broken away through peak 24 taken along the line IV—IV of FIG. 3.

A plurality of circumferentially distributed inclined V-shaped troughs 22 which diverge downwardly are provided. Each of said troughs 22 including oppositely disposed trough walls 23. Conical peak sections 24 are provided. Each of the 30° conical peak sections 24 separate an adjacent pair of trough walls 23a, 23b as shown in FIG. 2. Each of the troughs 22 have a sludge port 28 extending therethrough at the lower most portion 30 thereof, as shown in FIG. 4, and in vertical alignment with the sludge ports 28 of the other lamella members 18 which provides a means for sludge to exit the clarifier as discussed in U.S. Pat. No. 3,306,456. The sludge ports 28 include sludge port walls 32 extending below the lower most portion 30 of the troughs 22.

The troughs 22 include integral dam means 34 surrounding a predetermined portion, such as 270°, of each of the sludge ports 28, as shown in FIG. 2. The dam 34 includes lowermost dam portion 36, at the outer periphery 38 of the lamella member 18. A pair of oppositely disposed sidewall members 40a, 40b are included adjacent the lowermost dam portion 36.

Figure 3:
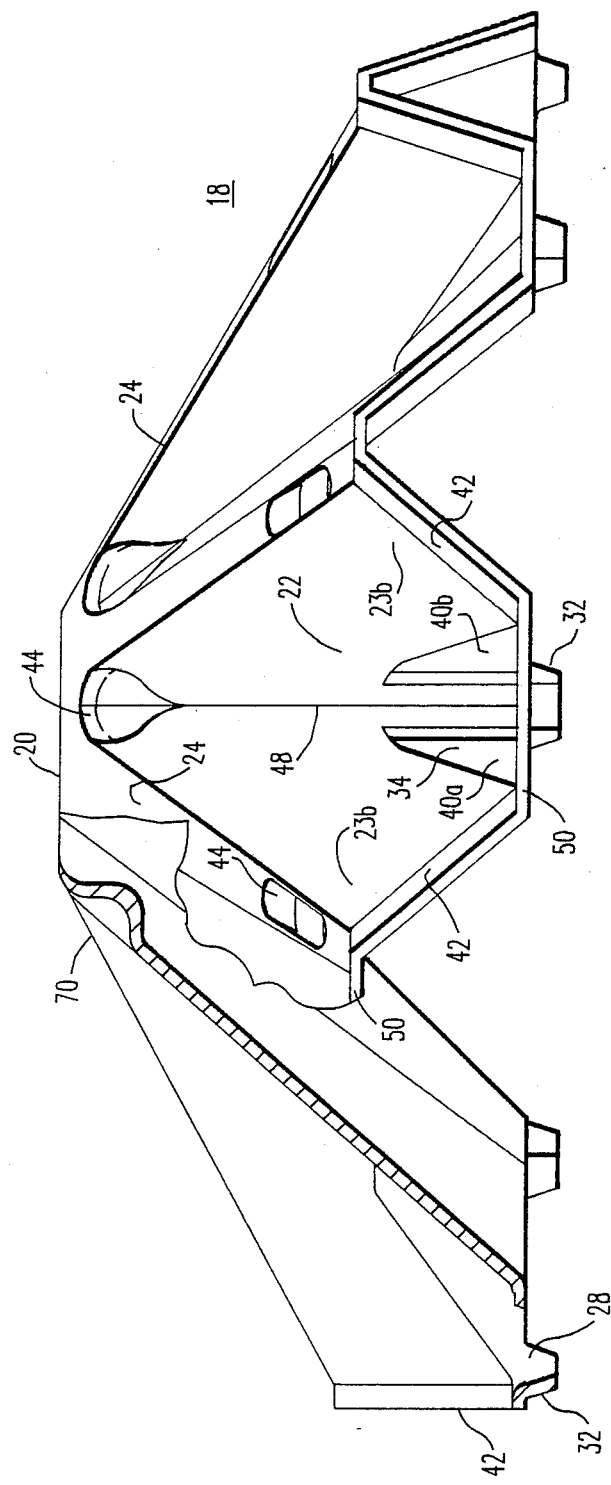
FIG. 3 is an elevational view of the lamella member of the present invention partly broken away through sludge port 28, taken along the line III—III in FIG. 2.

Integral flow straightening radially extending lip member 42 extends from each of the trough walls 23 at the outer periphery 38 of the lamella member 18 between the dam means 34 and the conical peak section 24 as shown in FIG. 3. The radially extending lip member 42 of the present invention at the entrance to the troughs 22 acts as a flow straightener for the turbulent flow from the input means and converts the flow to laminar flow prior to its entrance into separation gap 25 between lamella members. It has been found that with a radially extending lip member 42 the conversion of turbulent flow to laminar flow of the incoming liquid, is optimized while maintaining the maximum flow through the gap separation.

The lamella clarifier 10 desirably further includes integral radially extending rigidizing lip members 50, as shown in FIGS. 3 and 4, adjacent the flow-straightening lip members 42 and cooperating with the flow-straightening lip members 42 to encircle the lamella member 18 thereby providing increased rigidity to the lamella member 18 which is required for the lamella members when utilized in a stacked array.

Preferably the lip member 42 has a radial dimension equal to about at least three times the separation gap 25 between the lamella members 42 to about four times the separation gap. For example, in a lamella clarifier made of plastic for a separation gap of 0.05 inch, the radial dimension of the lip member 42 preferably is 0.187 inch. In one of the preferred embodiments the radial dimension of lip member 42 is 3.5 times the separation gap 25 of the lamella members.

A containment means 43 for housing the lamella or lamellas 17 is provided as shown in FIG. 1. The containment means 43 is in fluid communication with the input 12 and the output 14.

Lamella members 18 also include integral spacer and support means 44 and 45, as shown in FIGS. 2-4, for providing the predetermined gap separation 25 between lamella members 18. Sludge removal means 46 is provided for removing the sludge draining from the sludge ports 28 as described in U.S. Pat. No. 3,306,456. Sludge removal means 46, shown in FIG. 1, may include sludge storage chamber 47, sludge entrance apertures 51, and liquid output pipe 49, for example.

It has been found that the length of the dam sidewalls 40a, 40b should be at least about one fifth the length of the bottom 48 of the V-shaped trough 22 to about one fourth the length of the bottom 48 of the V-shaped trough 22. In a preferred embodiment the length of the dam sidewalls 40a, 40b is one fifth the length of the bottom 48 of the V-shaped trough 22. Preferably the bottom 48 of the V-shaped trough 22 is at about a 60 degree angle to the axis of lamella member 18. This provides an optimum slope for particular migration to the sludge port 28.

Figure 1B:
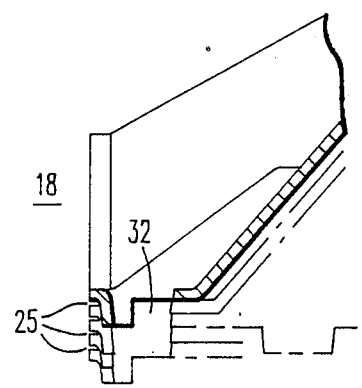
FIG. 1B is a partial elevational view of the lamella members 18 showing the separation gap.

It has been found that the sludge port walls 32 should be tapered preferably at an angle of 7 degrees, for example, from the vertical to provide a means of separation and interlocking between adjoining lamella members 18, as shown in FIG. 1B.

Another embodiment of the invention provides first imaginary extensions 52 as shown in FIG. 2 of the edges 54 of adjacent conical peaks 24 are desirably coterminous with each other and the edge 58 of the central opening 20. This provides unimpeded flow of clean fluid and maximizes flow area. Also it has been found desirable that the lamella member 18 is constructed so that a second imaginary extension 60 of the bottom 48 of the V-shaped trough 22 intersects at a point 56 at the intersection of the imaginary extension 52 of the edges 54 of adjoining peak sections 24. It has been found that this maximizes the clean flow area for the lamella member 18.

Utilizing the present invention, with a lamella member having an outside diameter of 12 inches, the length of the trough may be extended from 4.75 inches utilizing the prior art design as disclosed in the aforesaid U.S. Pat. No. 4,406,456 to 6.0 inches. This represents a 26% increase in residence time for the fluid mixture to be clarified at the same flow velocity of the aforesaid invention disclosed in U.S. Pat. No. 3,306,456. This is accomplished by a smaller inside diameter for control opening 20 and steeper angles for the trough 22 and elimination of the baffle 58 of the aforesaid prior invention.

It has been found the lamella clarifier member 18 of the present invention is readily adaptable and may perform such functions as flyash removal from forced draft gas in fossil fuel boilers. With such an environment the clarifier member 18 is desirably made of ceramic material. High temperature gas streams eminating from the boiler, as known in the art, contains flyash and corrosive compounds which promote slagging. Plastic or metal clarifiers are not suited to the gas temperatures which range from 1600° F. to 2500° F. The integral spacer and support means 44, as shown in FIGS. 2-4 are not required for ceramic elements since ceramic elements are much thicker i.e., on the order of 0.100 inch to 0.125 inch. The rigid ceramic element will not require three support points shown in FIG. 2, for example, but will only require a support 45 or spacing factor at the sludge port 28 only. In this configuration a plenum may function as the containment means 43 and a plurality of lamellas 17 may be utilized.

It has been found that in using the lamella clarifier member 18 of the present invention for removing flyash it may be desirable that the ceramic is provided with an inert surface condition which can be accomplished by ion implanting a surface protection such as silicon carbide on the surface of the clarifier member 18 to prevent fly ash slagging constituents from adhering to the clarifier member 18.

Figure 5:
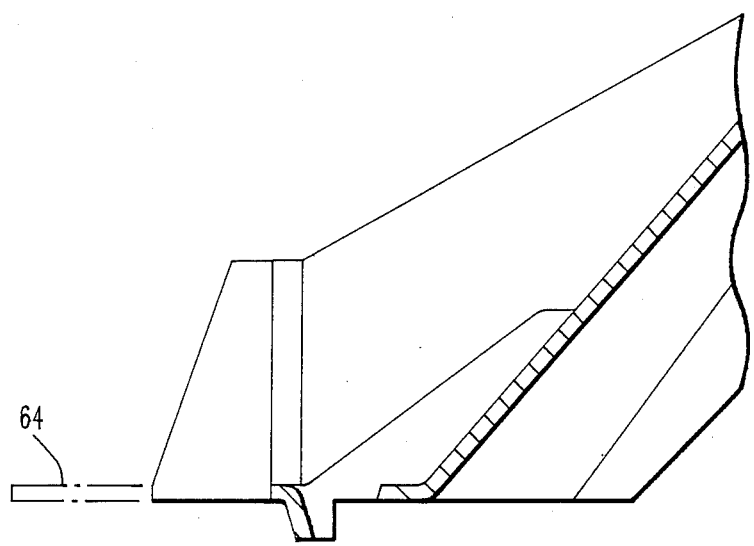
FIG. 5 is an elevational view of the work piece after initial shearing after vacuum forming of the lamella member.
Figure 6:
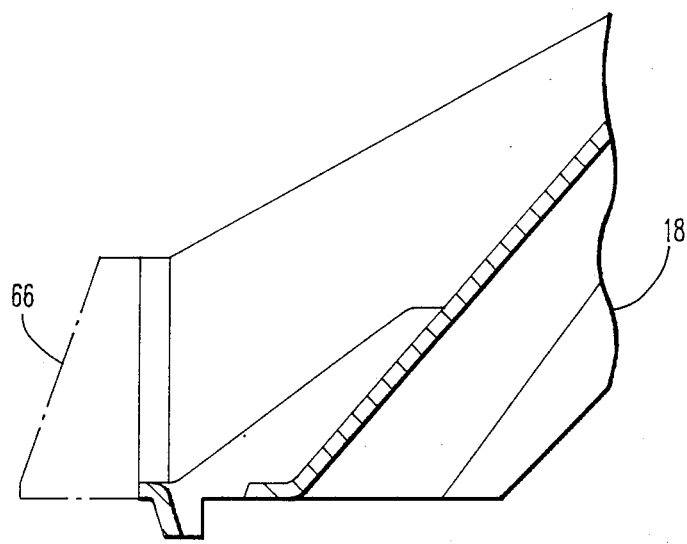
FIG. 6 is a sectional elevational view of the lamella member during the final shearing operation.

The lamella clarifier member 18 of the present invention may be made of plastic by vacuum molding. The method entails placing a plastic sheeting to be formed over a vacuum forming mold to form the present lamella shape shown in FIG. 5. Outer surplus material 64 is initially sheared off. Referring to FIG. 6 sloping outer perimeter 66 may then be finally trimmed utilizing a punch and die arrangement thereby leaving the lamella member 18. The sloping outer perimeter 66 which was removed is included to permit removal of the lamella 18 from the vacuum forming mold following the initial forming prior to the final trimming operation which permits a punch and die arrangement, now shown. The punch and die form to cooperate with the convolutions of the V-shape trough to form the lip members 42 and 50 which provide the flow straigtening and rigidity functions previously mentioned.

For radioactive particles, such as uranium oxide as produced by the 3-Mile Island accident, plastic clarifier elements cannot be tolerated. In such applications metal is required. In the case of making the lamella member 10 of the present invention out of the metal this may be accomplished by formig a metal shape of nickel or other metal by vapor deposition to a thickness of 0.006 to 0.010 inches for example. Vapor deposition is well known in the art and will have the same shape as the plastic article after the initial shear operation described previously for the plastic article. The punch and die operation described with the plastic article may also be used to form the lip members 42 and 50 of the metal article.

I claim:

1. A circular lamella clarifier comprising an input means, an output means, a pump means in fluid communication with said input means and said output means, lamella means comprising a plurality of vertically stacked thin-walled hollow frusto-conical spaced-apart convoluted lamella members, each of said lamella members having a central opening in vertical alignment with the central openings of the said other lamella members, a plurality of circumferentially distributed inclined V-shaped troughs which divert downwardly, each of said troughs including oppositely disposed trough walls, a plurality of conical peak sections, each of said peak sections separating adjacent pairs of said trough walls, each of said troughs having a sludge port extending therethrough at the lower most portion thereof and in vertical alignemnt with the sludge ports of said other lamella members, said sludge ports including sludge port walls extending below said lower most portions of said troughs, said troughs including integral dam means, said dam means surrounding a predetermined portion of each of said sludge ports, said dam means including a lowermost dam portion at the outer periphery of said lamella member and a pair of oppositely disposed sidewall members adjacent said lower most dam portion, integral flow-straightening radially-extending lip members extending from each of said trough walls at the outer periphery of lamella member, a containment means for housing said lamella means, said containment means in fluid communication with said input means and said output means, integral spacer and support means for providing a predetermined gap separation between said lamella members, sludge removal means for removing sludge collected from said lamella members.

2. The lamella clarifier of claim 1, wherein said lip member has a radial dimension equal to about at least three times said gap separation between said lamella members to about four times said gap separation.

3. The lamella clarifier of claim 2, wherein said lip member has a radial dimension about 3.5 times said gap separation.

4. The lamella clarifier of claim 1, wherein the length of said sidewall members is at least about one fifth the length the bottom of the said V-shaped trough to about one fourth the length of the bottom of said V-shaped trough.

5. The lamella clarifier of claim 4, wherein the length of said sidewall members is one-fifth the length of the bottom of said V-shaped trough.

6. The lamella clarifier of claim 1, wherein the bottom of said V-shaped trough is at about a 60 degree angle to the axis of said lamella member.

7. The lamella clarifier of claim 1, wherein said sludge port walls are tapered.

8. The lamella clarifier of claim 7, wherein said tapered sludge port walls are at an angle of about 7 degrees from the vertical.

9. The lamella clarifier of claim 1, wherein said dam means surrounds a 270° portion of said sludge port leaving a 90° open area aligned with said trough bottom.

10. The lamella clarifier of claim 1, further comprising integral radially extending rigidizing lip members affixed to the outer periphery of said lamella member adjacent said flow straightening lip members and cooperating with said flow straightening lip members to encircle said lamella member thereby providing increased rigidity to said lamella member.

11. The lamella clarifier of claim 1, wherein said lamella members are constructed and arranged such that first imaginery extensions of adjoining edges of said peak sections intersect at point which is coterminous with the edge of said central opening.

12. The lamella clarifier of claim 11, wherein said lamella members are constructed and arranged such that second imaginery extension of the bottom of said V-shaped trough intersects said point of intersection of said imaginery extension of said adjoining edges of said peak sections, whereby a clean flow area is maximized for said lamella members.

13. The lamella clarifier of claim 1, wherein said lamella members are ceramic.

14. The lamella clarifier of claim 11, wherein said ceramic lamella members carry ion-implanted surface protection means proximate the surface of said clarifier member, whereby flyash constituents are prevented from adhering to said clarifier member.

15. The lamella clarifier of claim 14, wherein said ion-implanted surface protection means comprises silicon carbide.

* * * * *